Figure 1:
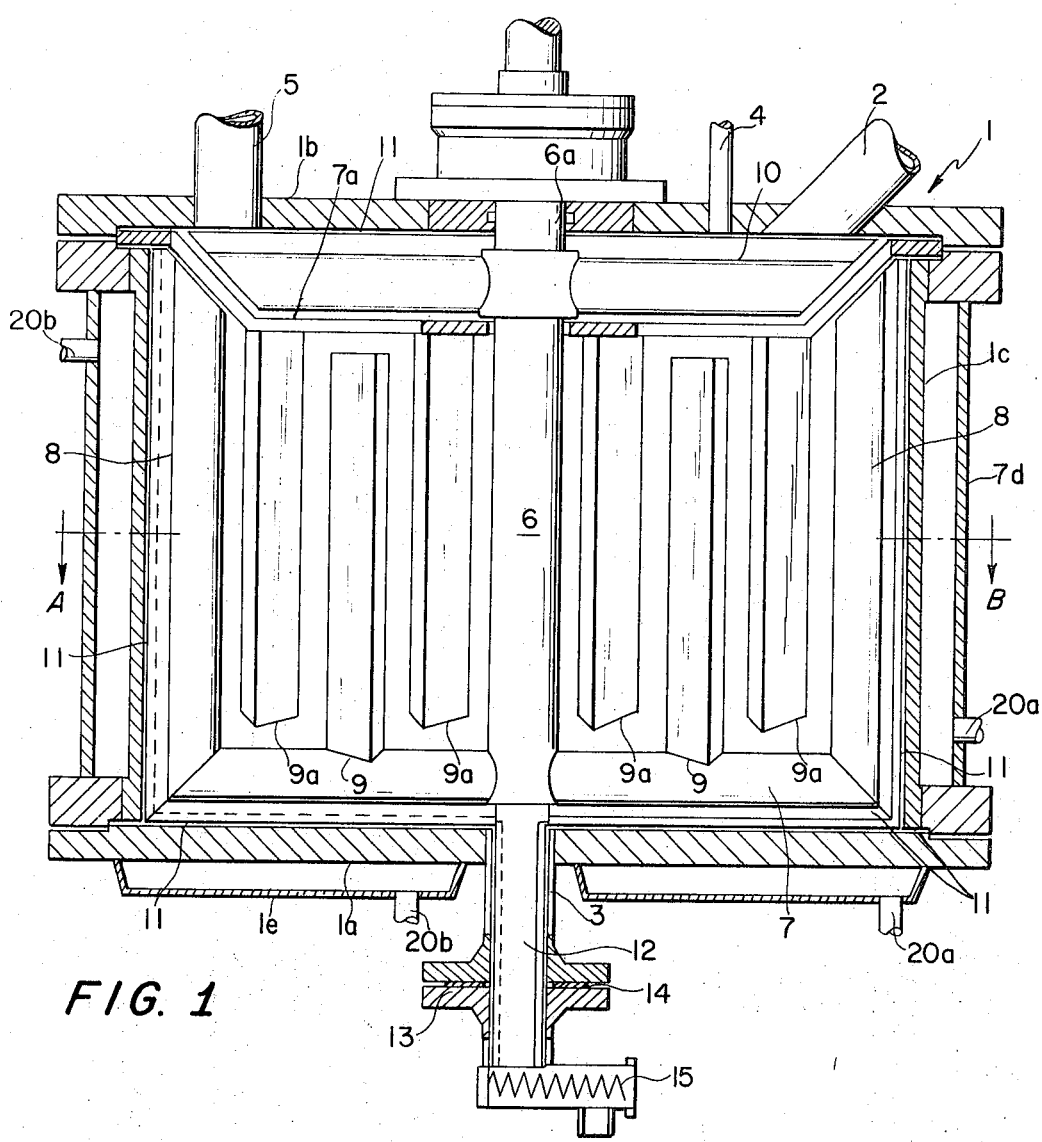

United States Patent
Grasemann et al.

[11] 3,791,435
[45] Feb. 12, 1974

[54] CONTINUOUS DEHYDRATION APPARATUS

[75] Inventors: Horst Grasemann, Marl; Hermann Rose, Essen, both of Germany

[73] Assignee: Chemische Werke Huls Aktiengesellschaft, Marl, Germany

[22] Filed: Dec. 17, 1971

[21] Appl. No.: 209,133

[30] Foreign Application Priority Data
Dec. 18, 1970  Germany............................ 2062452

[52] U.S. Cl.............. 159/25 A, 23/273 R, 159/45, 423/283
[51] Int. Cl............................ B01d 1/30, B01j 1/00
[58] Field of Search .. 159/25 A, 25 R, 45; 423/283; 23/273 R, 273 F

[56] References Cited
UNITED STATES PATENTS

| | | | |
|---|---|---|---|
| 219,411 | 9/1879 | Pond............................. | 159/25 A X |
| 1,737,624 | 12/1929 | Thomson........................ | 159/25 A |
| 2,121,208 | 6/1938 | Milligan........................ | 159/25 A X |
| 3,397,954 | 8/1968 | Russell et al................... | 423/283 X |

Primary Examiner—Norman Yudkoff
Assistant Examiner—Kenneth P. Van Wyck
Attorney, Agent, or Firm—Millen, Raptes & White

[57] ABSTRACT

Improved drying apparatus for the continuous dehydration of wet orthoboric acid to metaboric acid comprising a vessel fitted with product feed and discharge lines; with gas inlet and vapor outlet lines; and a vertically mounted agitator close fitted to the bottom and wall of the vessel; wherein the agitator has a vane perpendicularly mounted on the agitator shaft in scraping relationship to opposite sides of the vessel wall, on which vane is vertically mounted scraper elements; positioned at the ends of the vane in scraping relationship to the vessel wall, and elongate paddles, positioned intermediate the agitator shaft and the scraper elements at an angle of incidence to the axis of the vane.

10 Claims, 2 Drawing Figures

PATENTED FEB 12 1974          3,791,435

INVENTORS
HORST GRASEMANN
HERMANN ROSE

Millen, Raptes & White
ATTORNEYS

3,791,435

CONTINUOUS DEHYDRATION APPARATUS

BACKGROUND OF THE INVENTION

The present invention relates to an apparatus for the continuous dehydration of orthoboric acid and other materials tending to lump during drying.

In the oxidation of hydrocarbons, e.g., cyclohexane, cyclododecane and paraffins, to alcohols with oxygen or oxygen-containing gases, boron compounds, e.g., boric acid and boric oxide, are conventionally employed. After the oxidation, the boron compounds are obtained as boric acid esters of the alcohol produced from the hydrocarbon. The boric acid esters are saponified with water or aqueous boric acid solutions in order to obtain the alcohol product. The thus-formed orthoboric acid is obtained as moist boric acid having a free water content of about 10–20 percent by weight, usually 5–10 percent by weight. For reuse, this moist orthoboric acid is dehydrated to metaboric acid. In this process, along with the adsorbed water, 1 mol of water is liberated per mol of orthoboric acid, i.e., about 29 percent by weight of water, based on the orthoboric acid, is produced. The boric acid is dehydrated at a temperature range of about 70° to 160° C., preferably about 150° to 160° C. The dehydrated boric acid tends to form lumps which results in clogging of the equipment. Consequently, in a conventional process, the dehydration is conducted in the presence of an organic liquid, preferably at high temperatures, e.g., 145°–155° C. German Patent DAS 1,238,886. This mode of operation has the disadvantage that because of the high boiling point of the cyclododecane-water azeotrope produced during the dehydration, the volatility of the boric acid is so high that the waste gas conduits and the condensers are clogged after a short operating period. The resulting cleaning down times reduce the space-time yield of the equipment considerably.

Also, the high operating temperatures in the reactor lead to lumping of the product with resultant clogging of the waste gas lines.

It was thus impossible to achieve completely satisfactory results using conventional drying devices of various types. When using fluidized-bed dryers, encrustations and nests of metaboric acid occur on the walls and on the screen bottom, so that such dryers must be cleaned at short intervals. Furthermore, a considerable amount of finely divided metaboric acid is lost in the drying air.

When using rotary baffle dryers, extensive caking occurs. It was also found that in this type of drying equipment only the free moisture is primarily removable so that the conversion to metaboric acid is, for all practical purposes, unsuccessful.

Caking and lumping also occurs using rotary disk dryers.

Technically satisfactory results are not achieved using drum dryers, with or without internal elements, vacuum tumbler dryers, and belt dryers.

Technically satisfactory results also could not be achieved using high-frequency dryers and spiral-tube heat exchangers.

It has now been found that caking and lumping can be avoided in the dehydration of orthoboric acid using the dehydration apparatus, a modification of drying equipment comprising a vessel with an agitator vertically mounted therein.

SUMMARY OF THE INVENTION

The drying apparatus of this invention comprises a vessel fitted with product feed and discharge lines; with gas inlet and vapor outlet lines; and a vertically mounted agitator close fitted to the bottom and wall of the vessel; wherein the agitator has a vane perpendicularly mounted on the agitator shaft in scraping relationship to opposite sides of the vessel wall, on which vane is vertically mounted scraper elements; positioned at the ends of the vane in scraping relationship to the vessel wall, and elongate paddles, positioned intermediate the agitator shaft and the scraper elements at an angle of incidence to the axis of the vane.

Objects of this invention include providing new apparatus and a process of dehydrating orthoboric acid in said apparatus.

THE DRAWINGS

Figure 2:
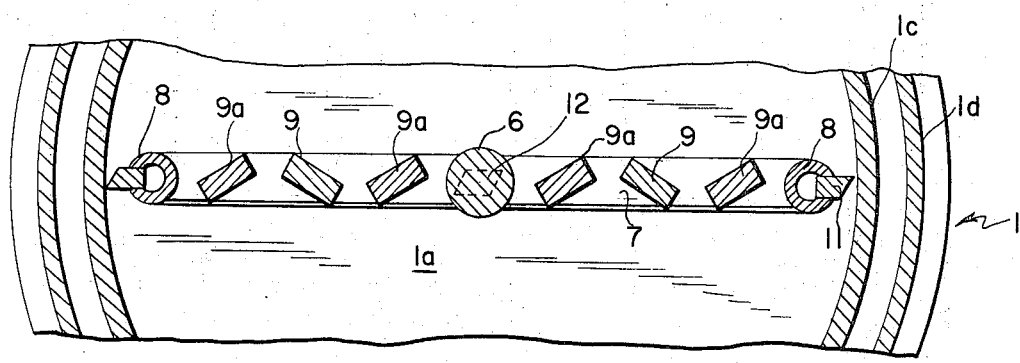

An embodiment of this invention is shown in the appending drawings, in which:

FIG. 1 is a sectional side view of the vessel showing in plan view the agitator vertically mounted thereon; and FIG. 2 is a partial sectional top view taken along the lines A–B of FIG. 1.

DETAILED DISCUSSION

With reference to the drawings, there is shown a conventional drying vessel 1 having bottom 1a, lid 1b and sidewall 1c members and fitted with fluid-tight sidewall 1d and bottom 1e cooling or heating jackets fitted with fluid lines 20a, 20b for circulating a heating or cooling fluid therethrough to heat or cool vessel 1, which is also fitted with a product feed line 2, a product discharge line 3, a gas inlet line 4, a vapor outlet line 5, and an axially mounted agitator 6 having a vertical shaft 6a. The agitator shaft 6a is fitted with a bottom vane 7 mounted perpendicularly to the agitator shaft 6a in close proximity to the bottom 1a of the vessel 1. On each end of the bottom vane 7 is vertically mounted a scraper element in close proximity to the sidewall 1c of the vessel 1. Upwardly mounted on the bottom vane 7 parallel to the axis of agitator shaft 6a, between the shaft 6a and the scraper elements 8, are vertical elongate rotating paddles or wiper arms 9. Mounted on the agitator shaft 6a, in close proximity to the top 1b of the vessel 1 is an upper vane 10. Fitted in the top of the vessel 1 between the upper vane 10 and the upper free ends of the scraper members 8 and the rotating paddles 9 is a recessed top mounting member 7a on which are downwardly mounted, parallel to the axis of the agitator shaft 6a, vertical elongate stationary paddles or wiper arms 9a, positioned so as to mesh with the rotating paddles 9.

The paddles 9, 9a have a non-circular cross section and are mounted so that their horizontal axis is at an inclined angle with respect to the axis of the agitator vane 7.

The paddles 9, 9a are advantageously of a rectangular cross section, but any other elongate or triangular cross section may be employed. The angle of incidence of the paddles is alternately positively and negatively 1° – 90°, preferably 25° – 35°, relative to the axis of the agitator vane 7, the positive direction being the direction pointing toward the shaft 6 and the negative direction being the direction pointing toward the wall of the vessel. The angle of incidence of two paddles 9, 9a positioned side-by-side is alternately positive and negative.

The bottom vane 7 is bottom fitted, the upper vane 10 is upper fitted and the scraper elements 8 are outwardly fitted with scraper blades to scrape the bottom 7a, the lid 1b and the side wall 1c of the vessel 1, respectively, free of encrustations and deposits thereon. The agitator shaft 6 has a scraper blade 12 extending into the product discharge line 3 to remove encrustations which would otherwise accumulate therein.

The blades 11, 12 extend as closely as possible to the adjacent wall of the vessel 1 and the product discharge line 3, respectively. The distance between the tip of the blade and the wall is 0.1 – 30 mm., preferably 0.3 – 0.5 mm.

The joint 13 where the product discharge line 3 is flanged to the vessel 1 contains an intermediate layer of insulation 14, e.g., asbestos. Furthermore, this part of the apparatus can be alternatingly heated, e.g., with an electrically heated heater element 15 or cooled with a cooling jacket (not shown).

The edge of the scraper blades 11, 12 exhibit an angle of 5° – 50°, especially 25° – 45°, relative to the central axis of the scraper blades.

The speed of rotation of the agitator 6 and thus the scraper elements 8 and the rotating paddles 9 is dependent on the size of the vessel 1 and the level of the orthoboric acid maintained in this vessel. Best results are obtained with a peripheral speed of about 2 – 15 m./sec.

In the dehydration of boric acid, an inert gas, preferably air, is conducted through the vessel, the gas either being fed into the vessel under an increased pressure, or withdrawn therefrom under a reduced pressure. Advantageously, a heated gas is used so as to maintain an inlet temperature of between about 20° and 160° C., preferably between 150° and 160° C. The fines suspended in the withdrawn vapors can be separated by conventional methods, such as by filtering or washing.

Prior to charging, the jacket 1d of the vessel 1 is preferably preheated with steam.

When using the apparatus of this invention, no caking and no lump formation between the paddles 9, 9a are observed, even after a 500 hour run. Likewise, no clogging of the product outlet line 3 can be observed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

Into an agitator-equipped vessel 1 as shown in FIGS. 1 and 2, having a capacity of 170 liters, is introduced a charge of 50 kg. of moist orthoboric acid having a metaboric acid content of 64 percent. Under agitation, 20 m³/h. of air is conducted over the charge. The temperature in the jacket of the reactor is maintained at 160° C. After 5 hours, the reaction is terminated. A 100 percent yield of metaboric acid is discharged from the vessel.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Drying apparatus for the continuous dehydration of orthoboric acid and the like materials tending to lump when drying, comprising a vessel fitted with product feed and discharge lines, gas inlet and outlet lines; a vertically positioned rotable agitator axially mounted therein and comprising a vertical shaft, vanes mounted on said shaft in close proximity to the bottom of the vessel and projecting radially outwardly, vertical scraper elements mounted on said vanes parallel to and in close proximity to sidewall of the vessel, said vanes and said scraper elements having blade members fitted in scraping relationship to the bottom and sidewall, respectively, to the vessel; rotating paddles mounted perpendicularly upwardly on said vanes; and stationary paddles mounted perpendicularly downwardly from the top of said vessel which mesh with said rotating paddles, said rotating and stationary paddles being noncircular in cross-section and mounted so that their respective axes are at an alternatingly positive and negative angle of incidence with respect to the axis of said agitator vane.

2. Apparatus according to claim 1 wherein the agitator shaft has a blade-shaped extension extending into a product discharge line of the vessel.

3. Apparatus according to claim 1 wherein the spacing between the scraper blades and the vessel walls is 0.1 – 30 mm.

4. Apparatus according to claim 1 wherein the paddles are rectangular in cross section.

5. Apparatus according to claim 4 wherein the angle of incidence of the axis of the paddles is 1° – 90°.

6. Apparatus according to claim 5 wherein the edge of the blades have an angle of 5° – 50° relative to the axis of the blades.

7. Apparatus according to claim 1 wherein the juncture of the product discharge line and the vessel comprises means for heating or cooling the juncture.

8. Apparatus according to claim 1 wherein the agitator shaft has a blade-shaped extension extending into a product discharge line of the vessel and wherein the paddles are rectangular in cross section.

9. Apparatus according to claim 1 having upper vanes mounted on said shaft in close proximity to the top of the vessel and projecting radially outwardly, said upper vanes having a blade member mounted thereon in scraping relationship to the top of said vessel.

10. Apparatus according to claim 9 wherein the agitator shaft has a blade-shaped extension extending into a product discharge line of the vessel; wherein the paddles are rectangular in cross section; and wherein the juncture of the product discharge line and the vessel comprises means for heating or cooling the juncture.

* * * * *